United States Patent Office 3,319,148
Patented May 9, 1967

3,319,148
DEVICE FOR GENERATING A MEASURING VOLTAGE PROPORTIONAL TO THE OUTPUT CURRENT OF A POWER RECTIFIER
Heinz Kraicar, Munich, Germany, assignor to Siemens-Schuckertwerke Aktiengesellschaft, Berlin-Siemensstadt, Germany, a corporation of Germany
Filed Aug. 19, 1964, Ser. No. 390,530
2 Claims. (Cl. 321—8)

My invention relates to electric power rectifier systems and has for its object to derive from the high load currents in such systems a proportional signal or pilot voltage for measuring, signalling, controlling or regulating purposes.

It is known to produce a direct voltage in proportion to the direct current output of a rectifier system by inductively linking two current transformers with respective two phases of a three-phase feeder line. The secondary windings of these current transformers supply current to three Y-connected resistors as well as to a three-phase rectifier bridge network from which the desired direct voltage is taken. Such an arrangement, however, furnishes a direct voltage which, under transitory or fluctuating conditions, particularly in the event of a short circuit, is not an accurate indication of the output current delivered by the power rectifier.

It is, therefore, a more specific object of my invention to improve multi-phase power rectifier systems so as to eliminate the above-mentioned disadvantage and provide, with the aid of relatively simple means, a direct voltage which is proportional to the output current of the power rectifier even under such abnormal operating conditions as mentioned above.

To this end, and in accordance with my invention, a multi-phase rectifier system having a total of $n$ phases is provided with $n-1$ current transformers which are linked with $n-1$ phases of the alternating current power supply line from which the power rectifier is energized, and $n-1$ load resistors are connected in the secondary circuits of the current transformers. These resistors are further connected to the alternating voltage input terminals of an n-phase rectifier bridge network so that the resistors impress their corresponding A.C. voltage drops (IR-drops) upon the network, the resistors being serially related to each other and poled to make the vector sum of the alternating voltages at the bridge input terminals equal to zero.

Figure 1:
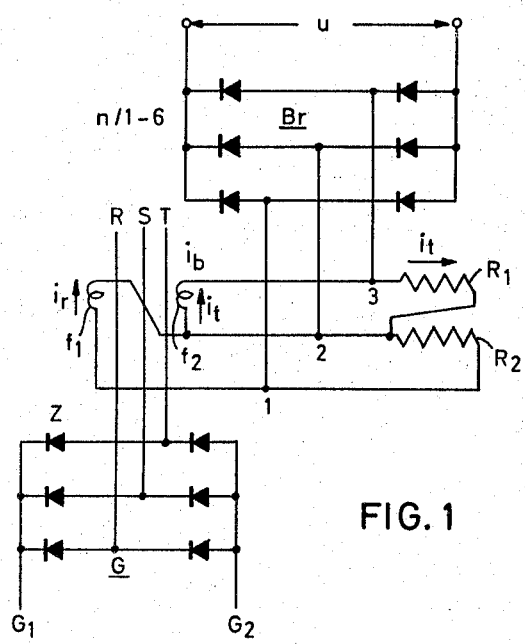
Figure 2:
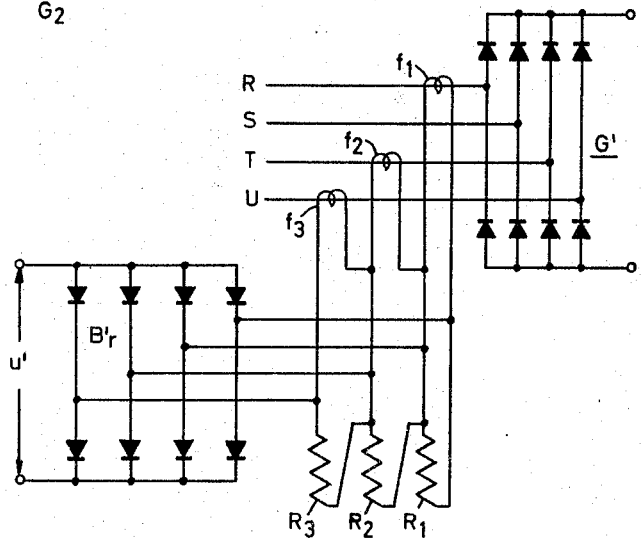

Embodiments of power rectifier systems with voltage generating devices of the present invention are illustrated by way of example in the accompanying drawings, in which:

FIG. 1 is a circuit diagram of an embodiment of the circuit arrangement of the present invention as utilized in a three-phase rectifier system; and FIG. 2 shows a circuit diagram of an embodiment of the circuit arrangement of the present invention as utilized in a four-phase power rectifier system.

In FIG. 1, the three-phase leads or buses of an alternating current line are denoted by R.S.T. These phases of the power supply line are connected to a power rectifier G of the bridge type which comprises rectifier cells Z and furnishes direct current through the output buses G1 and G2. Two current transformers $f1$ and $f2$ of the same transformation ratio are inductively linked with the feeder buses R and T respectively. The output or secondary windings of the transformers are connected in series, the upper end of the winding in transformer $f1$ being connected with the lower end of transformer $f2$, assuming that both have the same winding sense. Connected to the transformer windings are respective resistors $R_1$ and $R_2$ of the same resistance rating. The two resistors are connected in series, thus jointly constituting a voltage divider. Connected to the two end points and the midpoint of the voltage divider $R_1$, $R_2$ is a rectifier $Br$ in three-phase bridge connection. A direct voltage 4 is provided across the output terminals of the rectifier $Br$.

The circuit arrangement of the invention has the advantage that only voltages, but no appreciable current intensities, are to be rectified in the bridge network $Br$, so that small diodes for very low current intensities can be employed. This is because the relatively high current occuring in the event of a short circuit on the low-voltage side of the current transformers, does not flow through the rectifier diodes in the bridge network $Br$, but only passes through the series connected resistors $R_1$ and $R_2$ since only the voltage drop of said resistors is rectified to furnish the output voltage $u$.

Nevertheless, even if very high current intensity, such as under short-circuit conditions, occurs, the output voltage $u$ of the bridge network $Br$ preserves the desired proportionality to the direct load current in the output buses G1, G2 of the power rectifier G. This will be understood from the following.

The current in the transformer $f1$ is denoted by $i_r$ and the current in the transformer $f2$ is denoted by $i_t$. The effective resistance value of the two resistors $R_1$ and $R_2$ is assumed to be equal and is denoted by R. Hence the voltage drop of resistor $R_2$ is equal to $R \cdot i_r$. The voltage drop at the entire voltage divider, formed by the two resistors, is $R_2 \cdot i_r + R_1 \cdot i_t$. Since the two resistances are equal, the voltage drop amounts to $R \cdot (i_r + i_t)$. Since the sum of the currents is equal to zero, the current in the third phase, not provided with a current transformer, corresponds to a value $i_s$. The term $i_r + i_t$ may therefore be replaced by $-i_s$. It follows that the total voltage drop is equal to $-R \cdot i_s$. This proves that the vector sum of the alternating voltages impressed upon the bridge network $Br$ is equal to zero (as is the vector sum of the phase currents rectified by the power rectifier G).

The invention is particularly advantageous in conjunction with protective equipment for rectifier systems operating with extremely high current intensities, for example rectifier systems equipped with semiconductor p-n junction diodes on the basis of germanium, silicon or inter-metallic semiconductor compounds such as the $A^{III}B^V$ compound semiconductors.

The invention is not limited to any particular number of phases. Thus the embodiment shown in FIG. 2 exemplifies the invention in conjunction with a four-phase power rectifier system, the fourth phase being denoted by U. Three of the four feeder phases are provided with respective current transformers $f1$, $f2$, $f3$ to which respective resistors $R_1$, $R_2$, $R_3$ are connected in parallel. The three resistors are also connected in series with each other between the alternating voltage input terminals of a four-phase bridge network $Br'$ which furnishes the desired output voltage $u'$.

In devices according to the invention, the current transformers are preferably given the same rating and the same design, particularly the same transformation ratio, and, as mentioned, the respective voltage-drop resistors then all have the same resistance. When current transformers of respectively different transformation ratios are utilized, the ratio of the resistance values is preferably changed accordingly.

I claim:

1. In combination with a power rectifier and n-phase alternating current feeder means connected to said rectifier, circuit arrangement for producing a direct voltage proportional to the output current of said power rectifier, said circuit arrangement comprising $n-1$ current transformers linked respectively with $n-1$ phases of said feeder means, $n-1$ resistors connected across said respective current transformers, an n-phase rectifier bridge network having $n$ input terminals, said resistors being connected in series relation to each other between the input terminals of said rectifier bridge network and having respective voltage drops whose vector sum is equal to zero.

2. In combination with a power rectifier and n-phase alternating current power supply means connected to said rectifier, circuit arrangement for producing a direct voltage proportional to the output current of said power rectifier, said circuit arrangement comprising $n-1$ current transformers linked respectively with $n-1$ phases of said power supply means, said transformers each having the same transformation ratio and having secondary circuit, $n-1$ resistors each having the same resistance connected in the respectively secondary circuits, an n-phase rectifier bridge network having $n$ input terminals, said resistors being connected in series relation to each other between the input terminals of said rectifier bridge network with polarities which make the vector sum of the alternating voltages at said input terminals substantially equal to zero.

References Cited by the Examiner

FOREIGN PATENTS 1,085,602   7/1960   Germany.

JOHN F. COUCH, *Primary Examiner.*

W. H. BEHA, *Assistant Examiner.*